United States Patent
Przybyla et al.

(10) Patent No.: US 7,187,487 B2
(45) Date of Patent: Mar. 6, 2007

(54) LIGHT MODULATOR WITH A LIGHT-ABSORBING LAYER

(75) Inventors: James R. Przybyla, Philomath, OR (US); Arthur R. Piehl, Corvallis, OR (US); Michael G. Monroe, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 62 days.

(21) Appl. No.: 10/903,032

(22) Filed: Jul. 30, 2004

(65) Prior Publication Data

US 2006/0023287 A1 Feb. 2, 2006

(51) Int. Cl.
- G02B 26/00 (2006.01)
- G02F 1/29 (2006.01)
- G02F 1/00 (2006.01)
- G09G 3/34 (2006.01)

(52) U.S. Cl. ............. 359/290; 359/292; 359/295; 359/298; 359/302; 359/315; 359/318; 345/85; 345/108; 348/770; 348/771

(58) Field of Classification Search ............. 359/223, 359/224, 290–298, 302, 315–320; 345/84, 345/85, 108; 348/195, 203, 607, 755, 759, 348/760, 764, 770, 771
See application file for complete search history.

(56) References Cited

U.S. PATENT DOCUMENTS

| 4,572,615 | A | 2/1986 | Nickol et al. |
| 5,949,571 | A | 9/1999 | Goossen et al. |
| 6,034,807 | A | 3/2000 | Little et al. |
| 6,282,010 | B1 * | 8/2001 | Sulzbach et al. ............ 359/249 |
| 2004/0100677 | A1 * | 5/2004 | Huibers et al. ............. 359/290 |

OTHER PUBLICATIONS

Panosyan et al, "Optical Properties of Tantalum Aluminum Oxide Solid Solutions," translation from Zhurnal Prikladnoi Spektroskopii, vol. 39, No. 6, pp. 1001-1003, Dec. 1983.*

* cited by examiner

Primary Examiner—Evelyn A. Lester

(57) ABSTRACT

A spatial light modulator includes a first region and a second region. A light-absorbing layer contacts at least a portion of the second region. The light absorbing layer includes a first layer and a second layer, the second layer having a reflectivity less than about 75%.

40 Claims, 5 Drawing Sheets

LIGHT MODULATOR WITH A LIGHT-ABSORBING LAYER

BACKGROUND

Various technologies have been proposed for projection and display systems such as those utilizing spatial light modulation employing various materials. Among these are micromechanical spatial light modulation (SLM) devices in which a large portion of the device is optically active. In such systems a pixel area includes usable area for color generation for the imaging system. However, these systems also have areas that are not available for light generation, but that do reflect light that may, in some instances, degrade the color gamut and the contrast of the system.

BRIEF DESCRIPTION OF THE DRAWINGS

Objects, features, and advantages will become apparent by reference to the following detailed description drawings in which like reference numerals correspond to similar, though not necessarily identical, components. For the sake of brevity, reference numerals having a previously described function may not necessarily be described in connection with the subsequent drawings in which they appear.

DETAILED DESCRIPTION

Figure 1:
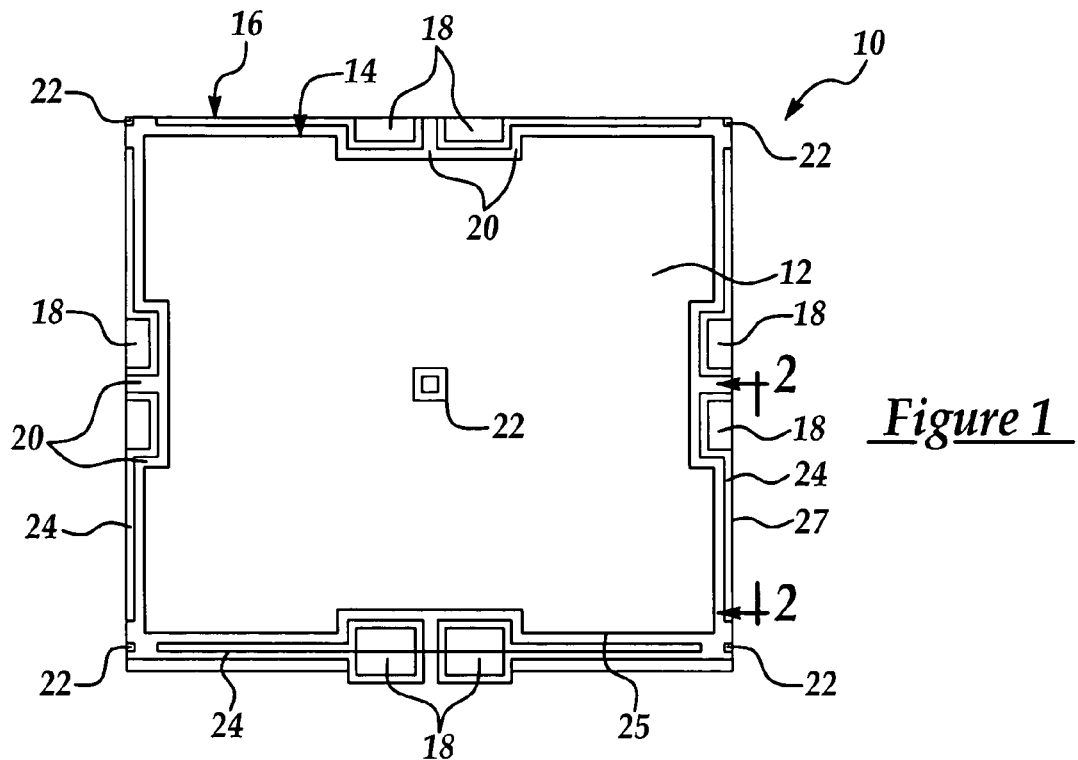
FIG. 1 is a top view of an embodiment of a representative pixel cell of a light modulation device.

Disclosed herein is a light-absorbing layer construction suitable for use with various electronic devices such as optical electronic display devices, for example spatial light modulators and the like. Without being bound to any theory, in some embodiments, the light-absorbing layer may reduce reflection of incidental light from the areas not available for color generation, and allow most of the reflected light to be dominated by the pixel area of the device in which it is used.

In an example embodiment as disclosed herein, a light-absorbing layer (hiding layer, or HID layer) is deposited over regions of the light modulation device that are not available for usable light generation (referred to herein as the second region). These regions may be ancillary members of the light modulation device that support and connect the operative areas together or may be artifacts remaining from the fabrication process. Generally, light that reflects from these regions may degrade the color gamut and the contrast of the associated system. The light-absorbing layer may advantageously substantially prevent light from reaching the regions of the light modulation device that are not available for usable light generation. The light-absorbing layer may also advantageously result in reduction in the dark-state reflected light and an increase in the usable light for color generation.

Pursuant to some example embodiments, the light-absorbing layer may include at least one layer containing at least one material capable of absorbing at least a portion of directed light having a wavelength in a suitable predetermined range. One non-limiting example of a predetermined range is the range of visible light, i.e., 400 to 700 nanometers. Suitable materials include, but are not limited to at least one of tantalum aluminum alloys, tungsten silicon nitride alloys, tantalum nitride alloys, nickel, nickel alloys, titanium nitride alloys, and mixtures thereof.

The light-absorbing layer may be employed with various light modulation devices of which spatial light modulation devices are a non-limiting example. Suitable devices will generally include a substrate, a first region disposed on a first portion of the substrate, and a second region disposed on a second portion of the substrate. As used herein the term "first region" is defined as a region or regions of the associated device that is generally usable for color generation. Various hues of color may be used in suitable display systems in which pixel cells having first region(s) are employed. The term "second region" as used herein is defined as a region or regions located on, in and/or adjacent the substrate that is/are not available for primary purpose or function (e.g. color generation) but possesses a degree of reflectivity. Examples of second regions include, but are not limited to, architectural elements to support function of the device, as well as artifacts remaining from fabrication or assembly. Examples of functional architectural elements include, but are not limited to, flexures, posts, bottom capacitor plate regions, boundary regions, and the like. Non-limiting examples of fabrication artifacts include vias, clearout apertures, and the like.

For illustrative purposes, FIG. 1 depicts a portion of a light modulation device, or a pixel cell 10. The pixel cell 10 has a pixel 12. As employed herein, the pixel 12 is the area of the pixel cell 10 that actively modulates light in various colors. Modulation may be accomplished in any suitable manner. It is contemplated that the active or functional portion of each pixel cell 10 constitutes a primary light reflective region 14.

The pixel 12 is depicted as an essentially square member in FIG. 1. However, it is contemplated that pixel 12 may have any suitable geometry and/or configuration. Further, it is to be understood that an array of pixels 12 may be used. The array may include any number of pixels 12 to achieve the desired function. For simplicity, the discussion will be directed to a single pixel 12 as shown in FIG. 1.

In addition to the first region 14, the pixel cell 10 shown in FIG. 1 has other areas or regions that are not available for active light modulation. These regions may be necessary for ancillary functions of the pixel cell 10 or may be artifacts remaining from fabrication. Generally, light reflected from these areas during pixel operation in its dark state may, in some instances, degrade the color gamut and the contrast of the associated system. As depicted in FIG. 1, these areas are collectively designated as second region 16. Non-limiting examples of elements that may be included in the second region 16 of a pixel cell 10 include, but are not limited to post(s) 18, bottom capacitor plate region(s) 20, clearout holes or region(s) 22 and flexure(s) 24, and boundary regions 27. It is to be understood that the configuration, location, and operation of various elements in the second region 16 may vary from pixel cell 10 configuration to pixel cell 10 configuration. It is contemplated that architectural features included in the second region 16 may be shared by one or more pixel cells 10 in a given array as desired and/or required. Thus, posts 18 may be shared with adjacent pixel cells 10. Similarly, flexures 24 may also be shared as desired.

Each pixel 12 may include a suitable architecture such as support post 18. The support post 18 may be positioned as desired to facilitate operation of the device. As depicted, the support posts 18 may be positioned proximate to locations such as edge 25 depending upon the specific architecture of the pixel cell 10. Similarly, each pixel 12 may include various other incidental light reflective structures at locations suitable for pixel 12 function fabrication or the like. Individually or collectively, these elements form the second region 16. It is contemplated that the second region 16 may make up a contiguous or noncontiguous region on the pixel cell 10.

A light-absorbing layer 28 (shown in FIGS. 2A and 2B) contacts at least a portion of the second region 16 in a manner that reduces the amount of light reflected from the region 16. The terms "contacts," "contacting," "in contact with," or the like as used herein is contemplated as including direct contact and/or indirect contact between two or more elements. It is contemplated that light-absorbing layer 28 may contact portions of the second region 16 sufficient to reduce undesired reflected light without undue compromise to the function of the first region 14. Thus, the light-absorbing layer 28 may contact all or selected portions of the second region 16.

It is to be understood that the light-absorbing layer 28 may cover the second region 16 in any suitable manner that permits overlying relationship of the light-absorbing layer 28 with the second region 16. This may include direct contact between the respective elements and/or stand-off (i.e. indirect contact) between the elements as desired.

Figure 2A:
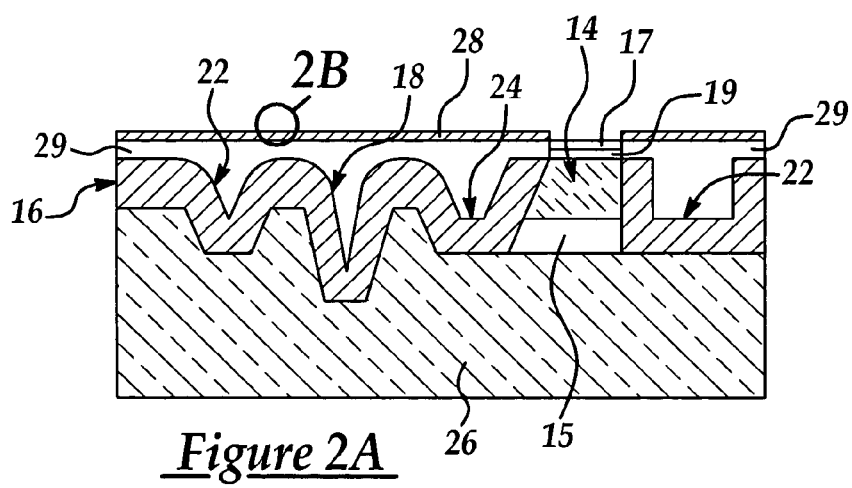
FIG. 2A is a cross-sectional view taken along the 2—2 line of FIG. 1 showing the representative pixel cell with a light-absorbing layer positioned on a second region according to an example embodiment.
Figure 2B:
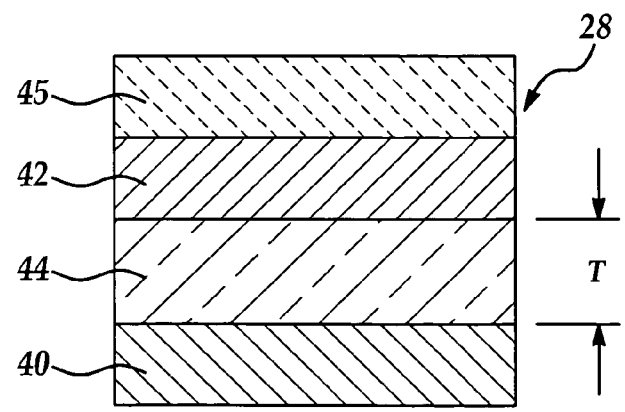
FIG. 2B is an enlarged cross-sectional view of the light-absorbing layer of FIG. 2A according to an example embodiment.
Figure 2C:
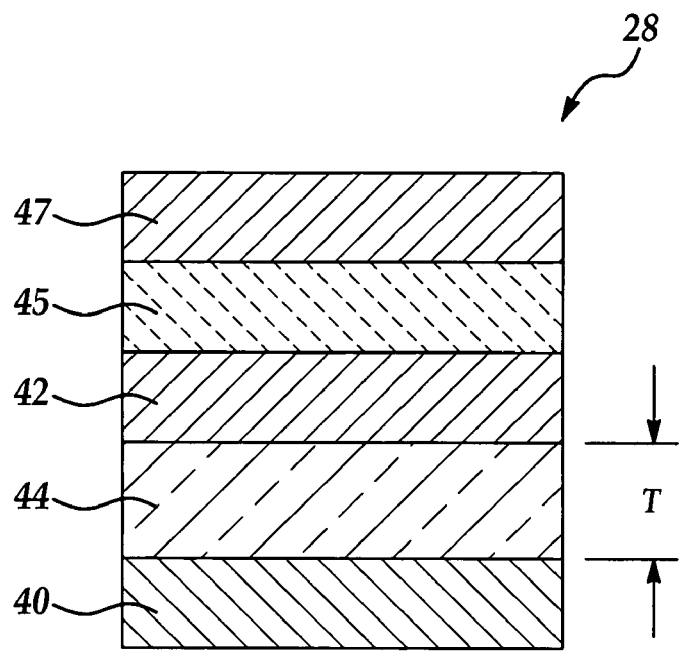
FIG. 2C is an enlarged cross-sectional view of the light-absorbing layer of FIG. 2A according to an example embodiment.

To further illustrate the light-absorbing layer 28 disclosed herein, attention is directed to FIGS. 2A, 2B, and 2C. FIG. 2A is a cross-sectional view taken of a portion of the pixel cell 10 taken along the 2—2 line of FIG. 1 that includes portions of the first region 14 and the second region 16 with the light-absorbing layer 28 contacting the second region 16. FIGS. 2B and 2C are enlarged cross-sectional views of embodiments of light-absorbing layer 28.

Now referring specifically to FIG. 2A, pixel cell 10 includes a substrate 26 composed of a suitable material. Examples of suitable substrate materials include, but are not limited to, silicon, glass, plastics, and various materials that can support CMOS architectures as well as other architectures and configurations.

The first region 14 may be composed of suitable reflective and modulating layers. As depicted herein, the first region 14 may include a lower reflective layer 15 and an overlying practical reflective layer 17 with an air gap 19 defined therebetween. A non-limiting example of one type of configuration is found in Fabry-Perot devices and the like. Other configurations having light reflective regions, such as micro-mirrors, liquid crystal on silicon (LCOS), and liquid crystal displays (LCD), are also contemplated.

At least one second region 16 is also disposed on substrate 26. As mentioned hereinabove, the "second region" is any region present in the pixel cell 10 that is not available for light modulation. Reflections emanating from the second region 16 may result in the degradation of the color gamut and the contrast during operation of the light modulation or display system employing such pixel cell(s) 10. It is contemplated that second region 16 may be composed of contiguous region(s) of pixel architecture. It is also possible that various noncontiguous regions may be disposed on the surface of substrate 26. The second region 16 may include various architectural features associated with the pixel cell 10.

In an embodiment, the light-absorbing layer 28 contacts at least a portion of the second region 16. As depicted in FIG. 2A, a non-limitative example of the light-absorbing layer 28 is contacting the second region 16 in a manner that defines a gap 29 located between the upper face of the second region 16 and the lower face of the light-absorbing layer 28. The light-absorbing layer 28 may be mounted on suitable supports (not shown) to define and maintain the appropriate gap 29.

In some embodiments, the light-absorbing layer 28 may directly contact the second region 16. It is also contemplated that various intermediate layers (not shown) may be interposed between the second region 16 and the light-absorbing layer 28. As such, where the light-absorbing layer 28 is referred to as being "on" or "at" the second region 16, this means that the layer 28 contacts the region 16 either directly or via one of the intermediate layers.

It is to be understood that the light-absorbing layer 28 may include at least two layers connected to one another. Where the various layers of the light-absorbing layer 28 are referred to as being "connected to" or "disposed on" other layers of the light-absorbing layer 28, as used herein, it is contemplated that this includes layers in direct contact with each other, or layers having other layers interposed therebetween. As depicted in FIG. 2B, the first (e.g. reflective) layer 40 is positioned proximate to the second region 16 and the second layer 42 is positioned distal to the second region 16.

It is contemplated that at least one of these two layers 40, 42 is composed of a material that reflects at least a portion of directed light at a given wavelength range, such as 400 to 700 nanometers. Suitable materials include, but are not limited to at least one of tantalum aluminum alloys, tungsten silicon nitride alloys, tantalum nitride alloys, nickel, nickel alloys, titanium nitride alloys, and mixtures thereof. Suitable tantalum aluminum alloys are generally depicted by the formula $Ta_xAl_y$, in which x and y may be present at a ratio between about 1:1 and about 1:2, tantalum to aluminum respectively. Suitable tungsten silicon nitride alloys are generally depicted by the formula WSiN in which the various components are generally present in atomic ratios ranging between about 2:4:5 and 2:4:9. Similarly titanium nitride may be depicted by the formula $Ti_xN_y$ with x and y representing an atomic ratio ranging between about 3:4 and about 4:3. In the embodiment depicted herein, the second layer 42 disposed distal to the second region 16 is composed of the enumerated materials, while the first layer 40 is composed of a material having reflectivity over a broader spectrum, including, but not limited to, aluminum, aluminum alloys, silver, silver alloys, gold, gold alloys, tantalum aluminum, titanium nitride, tungsten silicon nitride, tungsten, silicon, chromium, copper, and mixtures thereof.

As depicted in FIG. 2B, the light-absorbing layer 28 may include additional (e.g. three, four, etc. . . . ) layers. In a three layer configuration, the light-absorbing layer 28 includes a first layer 40, a second layer 42 connected to the first layer 40, and a third or standoff layer 44 interposed between the first layer 40 and the second layer 42. Generally, the combination of these three layers 40, 42, 44 is utilized to advantageously absorb light that would otherwise reflect off of the second region 16 and degrade the color gamut and contrast of the associated system. In an embodiment, a fourth (e.g. transparent dielectric) layer 45 may be disposed on the second layer 42.

It is to be understood that the thicknesses of each of the first layer 40, the second layer 42, the third (standoff) layer 44, and the fourth layer 45 may be sufficient to reduce the percentage of visible light reflected from the second region 16. The light-absorbing layer 28 is configured to absorb at least a portion of the light directed to the second region 16 in the visible light region. More particularly, the respective thicknesses of layers 40, 42, 44 and 45 may be configured to absorb at least a portion of directed light having a wavelength ranging between about 400 nanometers and about 700 nanometers. It is contemplated that materials used for the first layer 40, the second layer 42, the third layer 44, and the fourth layer 45, respectively, may be tuned at the visible spectrum to absorb incidental reflected light.

The first layer 40 of the light-absorbing layer 28 may be made of any suitable material having a reasonably high reflectivity. In an embodiment, the first layer 40 has a reflectivity greater than about 75% (e.g. a reflector layer). It is contemplated that materials having a reflectivity greater than about 85% may be advantageously employed, with some materials of choice typically having a reflectivity greater than about 90%. Examples of suitable materials that may be employed in this embodiment of first layer 40 include, but are not limited to at least one of aluminum, aluminum alloys, silver, silver alloys, copper, and/or gold. In an alternate embodiment, the reflectivity of the first layer 40 may be lower than about 75%. Suitable materials for the first layer 40 of this embodiment include, but are not limited to tantalum aluminum, titanium nitride, tungsten silicon nitride, tungsten, silicon, chromium, and mixtures thereof. The first layer 40 may have any suitable thickness appropriate for achieving the desired reflectivity and overall performance of the light-absorbing layer 28 and associated pixel cell 10. It is contemplated that the first layer 40 may have a thickness ranging between about 300 angstroms and about 5,000 angstroms.

The first layer 40 may exhibit substantially little or no transmittance. Therefore, in an embodiment, additional layers (a non-limiting example of which may be optically non-functional layers) may contact a side of the first layer 40 that is opposed to the side that contacts the second or third layers 42, 44 (i.e. under the first layer 40). It is to be understood that these additional layer(s) may not substantially interfere with the function of the light-absorbing layer 28. Without being bound to any theory, it is believed that the first layer 40 of the light-absorbing layer 28 may not substantially transmit light through to the additional layers, and thus the structure could be adapted in this manner without substantial change in the functionality of the light-absorbing layer 28.

The second layer 42 of the light-absorbing layer 28 may include any suitable material capable of absorbing at least a portion of reflected light in a range between 400 and 700 nanometers. In an embodiment as depicted, the second layer 42 materials include, but not limited to at least one of tantalum aluminum alloys, tungsten silicon nitride, tantalum nitride, nickel, nickel alloys, titanium nitride, and/or mixtures thereof. In a non-limiting example, the second layer 42 includes tantalum aluminum. The second layer 42 may be constructed with any thickness suitable to facilitate light absorption in the desired range and to facilitate the overall performance of the light-absorbing layer 28 and the associated pixel cell 10. In one embodiment, it is contemplated that the thickness of the second layer 42 ranges between about 50 angstroms and about 300 angstroms. Without being bound to any theory, it is believed that, in some embodiments, varying the thickness of the second layer 42 may assist in tuning the second layer 42 in the visible spectrum with absorption of at least a portion of reflected light having a wavelength between 400 and 700 nanometers occurring. Thus, for example, a material such as a tantalum aluminum alloy exhibits a broad low absorptivity band when present in thicknesses less than about 100 angstroms. Therefore, a tantalum aluminum alloy may be established as the second layer 42 in the light-absorbing layer 28 to permit light absorption in the visible spectrum to be tuned to the desired wavelength region.

A third (standoff) layer 44 may be interposed or established between the first layer 40 and the second layer 42. The third layer 44 has a thickness T and a degree of optical transparency value such that a portion of light directed at the second region 16 is absorbed. As depicted, the third layer 44 may serve to form an optical path length differential between light reflected off of the first layer 40 and light reflected off of the second layer 42 facilitating absorbance of a portion of the incidental reflected light. The third layer 44 may have any thickness suitable to achieve the desired optical path length differential and to facilitate function of the pixel cell 10. As depicted, it is contemplated that the third layer 44 has a thickness T ranging between about 300 angstroms and about 8000 angstroms. In a non-limiting example, the third layer 44 has a thickness ranging between about 250 and about 1000 angstroms.

The third (standoff) layer 44 may be composed of materials having suitable optic qualities such as a refractive index between about 0.005 and about 0.050 at the thickness T noted. Examples of suitable third layer 44 materials include, but are not limited to, at least one of silicon dioxide, silicon nitride, silicon carbide, and air.

As depicted herein, it is contemplated that the light-absorbing layer 28 may possess overall optical characteristics such as refractive index (n) and extinction coefficient (k), that are variably dependent on the wavelength of the light to be absorbed. It is contemplated that the light-absorbing layer 28 may efficiently exhibit a refractive index between 1.7 and 2.0 at a wavelength of 5500.

In an embodiment, the light-absorbing layer 28 may also include a fourth layer 45 established on the second layer 42. The fourth layer 45 may be any suitable material or mixture of materials adapted to perform a desired function (e.g. anti-reflective coating). In a non-limiting example embodiment, the material is a transparent dielectric. Any suitable transparent dielectric may be used, non-limiting examples of which include magnesium fluoride, silicon dioxide, titanium dioxide, magnesium oxide, alumina, zirconium dioxide, yttrium oxide, barium difluoride, calcium difluoride, lead fluoride, thorium dioxide, chromium oxide, hafnium dioxide, tin dioxide, zinc oxide, tantalum pentoxide, cadmium sulfide, zinc sulfide, and/or mixtures thereof. It is to be understood that the thickness of the fourth layer 45 ranges between about 0 angstroms and about 30,000 angstroms. In one embodiment, the fourth layer 45 is about 600 angstroms.

It is to be understood that the fourth layer's 45 refractive index and optical thickness may be selected such that the layer 45 acts as, for example, an anti-reflective coating to substantially minimize surface reflections. In an embodiment, the fourth layer 45 may include a graded index material(s) or film(s) such that it functions as an anti-reflective coating. In this embodiment, no additional anti-reflective coated is used. The refractive index of fourth layer 45 may vary throughout the layer 45 to substantially match the refractive index of air that may be present at an air/fourth layer 45 interface, thereby substantially reducing or eliminating surface reflections from the fourth layer 45. By gradually changing the refractive index throughout the layer 45, the abrupt optical interface between the layer 45 and the air is substantially reduced or eliminated. Without being bound to any theory, it is believed that reduction or elimination of the interface substantially reduces or eliminates surface reflections, which may be detrimental to contrast of the system.

The fourth layer 45 may also include a series of layers and/or multiple layers. This series of layers within layer 45 may include dielectric layers that serve to cancel undesirable reflections from each other. It is to be understood that this series of layers may act an as anti-reflective coating. The layer 45 may range between one to several dozen individual film stacks (layers) depending, in part, on the degree of complexity and functionality desired for the device 10.

In an embodiment in which the fourth layer 45 includes a series of layers acting as an anti-reflective coating, the thickness and refractive index of the layer(s) 45 may minimize reflections that may occur off of an optical interface between the second layer 42 and the fourth layer 45. It is to be understood that these undesirable reflections may degrade performance aspects of the light modulator, including, but not limited to color gamut and contrast. Non-limitative examples of materials that may be used in layer 45 to function as the anti-reflective coating include magnesium difluoride, titanium dioxide, silicon dioxide, magnesium oxide, alumina, zirconium dioxide, yttrium oxide, barium difluoride, calcium difluoride, lead fluoride, thorium dioxide, chromium oxide, hafnium dioxide, tin dioxide, zinc oxide, tantalum pentoxide, cadmium sulfide, zinc sulfide, and/or mixtures thereof.

FIG. 2C depicts an alternate embodiment of the fourth layer 45, in which an optional additional layer 47 is added to assist the fourth layer 45 in functioning as an anti-reflective coating.

Figure 3:
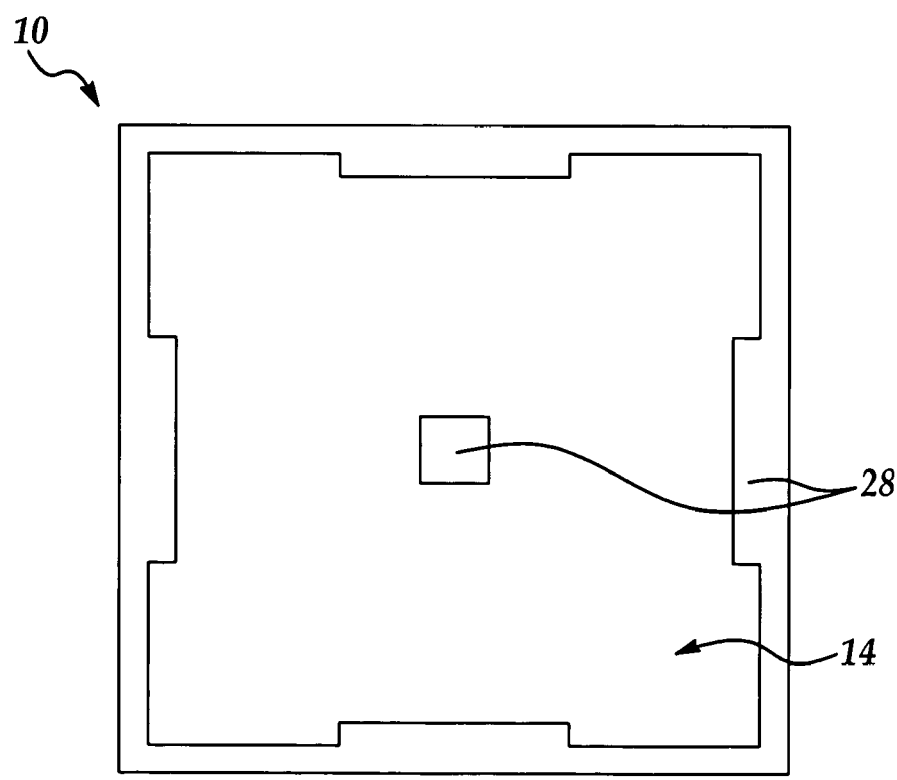
FIG. 3 is a top view of an embodiment of part of a light modulation device showing a light-absorbing layer over the second region(s) according to an example embodiment.

For illustrative purposes, FIG. 3 shows a top view of the pixel cell 10 of FIG. 1 with the light-absorbing layer 28 over the second region 16 including the clearout region 22 located in the center of the pixel 12.

Figure 4:
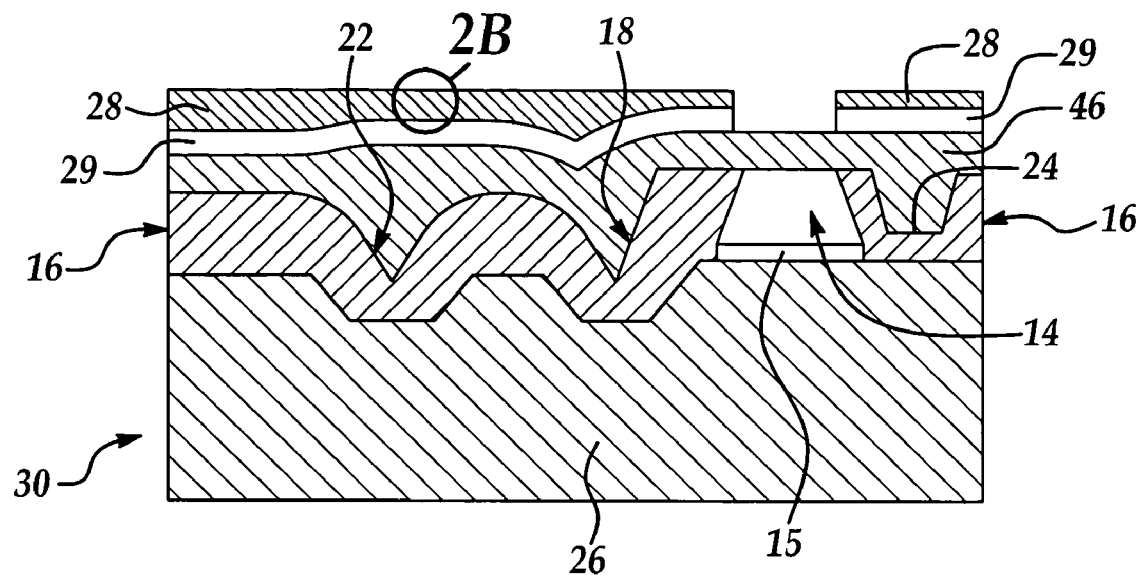
FIG. 4 is a cross-sectional view of a representative pixel cell of a dual gap display device showing the light-absorbing layer deposited on a passivation layer according to an example embodiment.

It is to be understood that the light-absorbing layer 28 may be positioned relative to the second region 16 in any manner that will facilitate reduction in the reflection of unwanted light. Thus, the light-absorbing layer 28 may contact (directly and/or indirectly) elements of the second region 16. By way of a non-limiting example, the device may include a passivation layer 46 disposed between the second region 16 and the light-absorbing layer 28 as shown in FIG. 4.

The passivation layer 46 may be selectively disposed on elements of the second 16 and may also be disposed on the first region 14. When the passivation layer 46 is disposed on the first region 14, it is contemplated that it will be composed of a material or materials that do not impede the performance of the first region 14. Thus, the material may possess suitable optical transparency as well as appropriate dielectric characteristics. Such materials are generally known to the skilled artisan.

When the passivation layer 46 is employed, it is contemplated that the light-absorbing layer 28 may be directly disposed on the passivation layer 46. Alternatively, a gap 29 may be formed between the passivation layer 46 and the light-absorbing layer 28, such that the light-absorbing layer 28 is suspended relative to the passivation layer 46 and the associated second region 16.

In some example embodiments, the light-absorbing layer 28 may be employed in a dual gap configuration. The dual-gap device 30 as depicted in FIG. 4 includes a passivation layer 46 disposed on the primary light reflective region 14, and also interposed between the light-absorbing layer 28 and the second region 16. As depicted, a gap 29 may be formed between the light-absorbing layer 28 and either the passivation layer 46 or the elements of the second region 16.

The pixel cell 10 having light-absorbing layer 28 may be made by a method that encompasses establishing a light-absorbing layer 28 in overlying relationship to a second region 16 on a substrate 26. The substrate 26 may have both a first region 14 and the second region 16 disposed thereon. "Establishing" as used herein contemplates suitable deposition and configuration or patterning steps.

Establishment of the light-absorbing layer 28 may include establishing at least two material layers in contact with the second region 16. In an embodiment, the second layer 42 has a reflectivity less than about 75%. The second layer 42 may be composed of a material that includes at least one of tantalum aluminum alloys, tungsten silicon alloys, tantalum nitride alloys, nickel, nickel alloys, tantalum nitride alloys, and mixtures thereof.

To produce the embodiment as depicted in FIG. 2B, the first layer 40 may be deposited by any suitable deposition technique. The third (standoff) layer 44 may then be deposited in contact with the first layer 40 by any suitable deposition technique. This is followed by deposition of the second layer 42. Still further, the method may include depositing a fourth (transparent dielectric) layer 45 on the second layer 42. Non-limitative examples of suitable deposition techniques include various additive processes including, but not limited to physical vapor deposition (PVD), chemical vapor deposition (CVD), plasma enhanced chemical vapor deposition (PECVD), evaporation, sputtering, epitaxy, and the like.

In some embodiments, the light-absorbing layer 28 may be constructed as a two-layer structure. In such embodiments, typically the two layers will include the first layer 40 having a reflectivity characteristic and the second layer 42 having a reflectivity less than about 75%.

In an example embodiment, the first layer 40 has a reflectivity greater than about 35%; while in an alternate embodiment, this reflectivity ranges between about 85% and about 92%. In an example embodiment, the second layer 42 has a reflectivity ranging between about 10% and about 25%; while in an alternate embodiment, this reflectivity ranges between about 25% and about 50%. In a further example embodiment, the reflectivity of both the first and second layers 40, 42 is less than about 75%. Still further, a non-limiting example embodiment includes the first layer 40 having a reflectivity ranging between about 40% and about 50% and the second layer 42 having a reflectivity ranging between about 15% and about 20%.

The fabrication methods as described herein may further include establishing a passivation layer 46 over the first region 14 and the second region 16. Establishment of the passivation layer 46 may occur prior to the establishment of the light-absorbing layer 28 (as depicted in FIG. 4) and may be accomplished by any suitable deposition processes and patterned as desired and/or required. This embodiment of the method contemplates direct contact between the passivation layer 46 and the light-absorbing layer 28. As discussed herein, a gap 29 may optionally be formed between the light-absorbing layer 28 and the passivation layer 46. The gap 29 may be formed by any suitable fabrication method or sequence.

An example of a non-limiting fabrication method is illustrated in the build sequence set forth in FIGS. 5A through 5D.

Figure 5A:
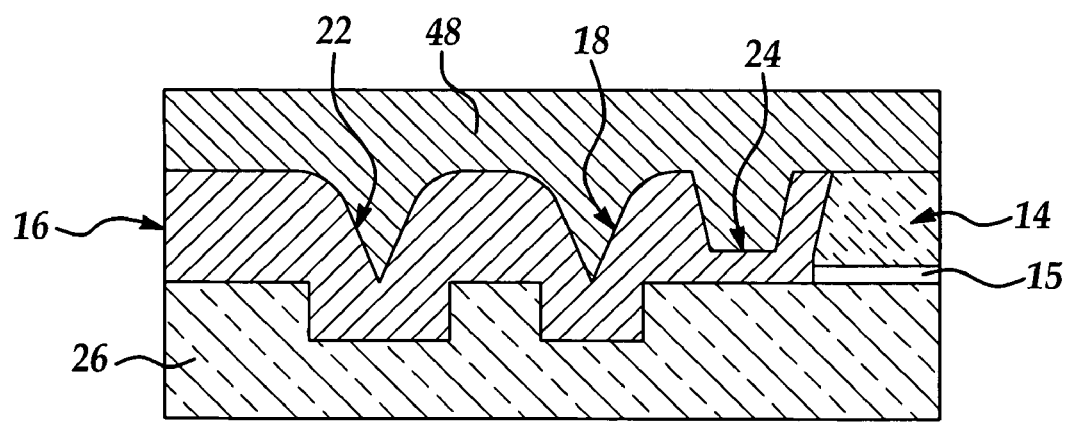
FIG. 5A is a cross-sectional view of a representative pixel cell of a single gap display device showing a sacrificial layer deposited thereon according to an example embodiment.

As depicted in FIG. 5A, a substrate 26 having at least one first region 14 and at least one second region 16 disposed thereon is provided.

A sacrificial layer 48 is established on at least a portion of the first region 14 (e.g. a pixel) and at least a portion of the second region 16. Establishment may be accomplished by suitable deposition and patterning techniques. The sacrificial layer 48 may be composed of any material suitable for subsequent removal by appropriated post fabrication removal techniques. Such removal techniques include, but are not limited to, various dry or wet etching methods (such as gas or vapor phase etching), physical etching by ion bombardment or plasma etching, and chemical or physical/chemical etching. It is also contemplated that the sacrificial material 48 of choice may be one amenable to wet etching methods or other subtractive processes. It is contemplated that suitable sacrificial layer 48 materials include, but are not limited to, compositions containing at least one of silicon, amorphous silicon, polysilicon, silicon nitride, silicon dioxide, and polyimide.

Figure 5B:
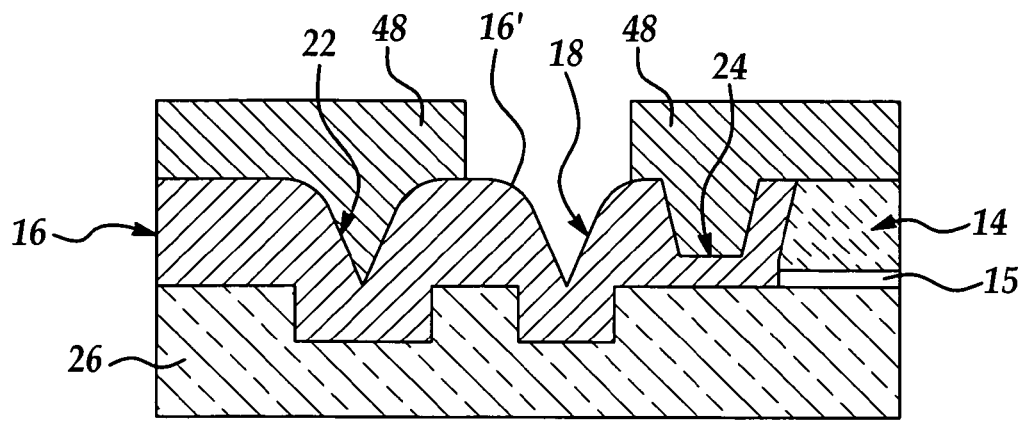
FIG. 5B is a cross-sectional view of the embodiment of FIG. 5A with a portion of the sacrificial layer removed according to an example embodiment.

Referring now to FIG. 5B, the method further includes removing a portion of the sacrificial layer 48 from a region/area overlying a portion of the second region 16 thereby forming an exposed second region 16'. The exposed second region 16' may act as a supportive connector region for the light-absorbing layer 28. By way of example, as illustrated in FIG. 5B, the sacrificial layer 48 is removed from an area above an element of the second region 16, such as at post 18.

Figure 5C:
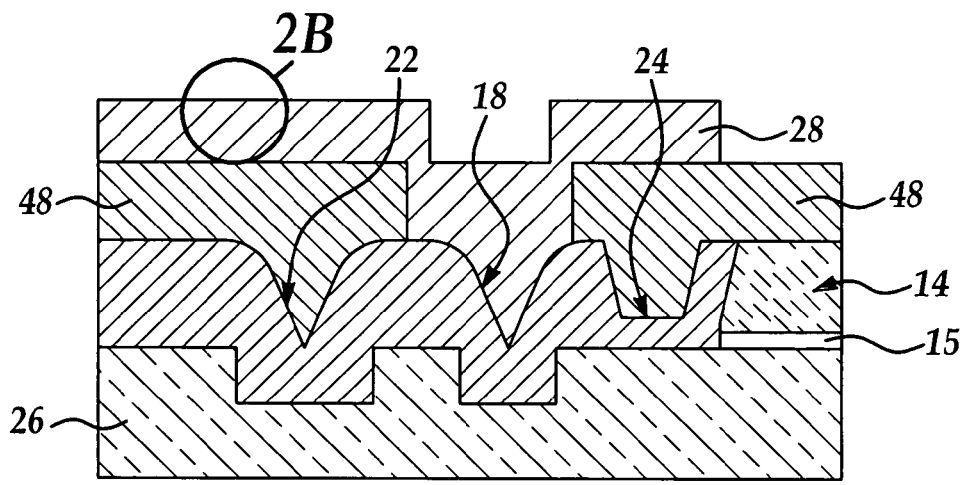
FIG. 5C is a cross-sectional view of the embodiment of FIG. 5B with an absorbing layer established thereon according to an example embodiment.

As depicted in FIG. 5C, after a portion of the sacrificial layer 48 is removed, the method further includes establishing the light-absorbing layer 28 on both the exposed second region 16' and on a remaining portion of the sacrificial layer 48 which lies over the second region 16. This results in a portion of the light-absorbing layer 28 being directly in contact with the exposed second region 16' (such as the region defined by post 18) and a second portion of the light-absorbing layer 28 being in contact with the remaining portion of the sacrificial material 48.

Figure 5D:
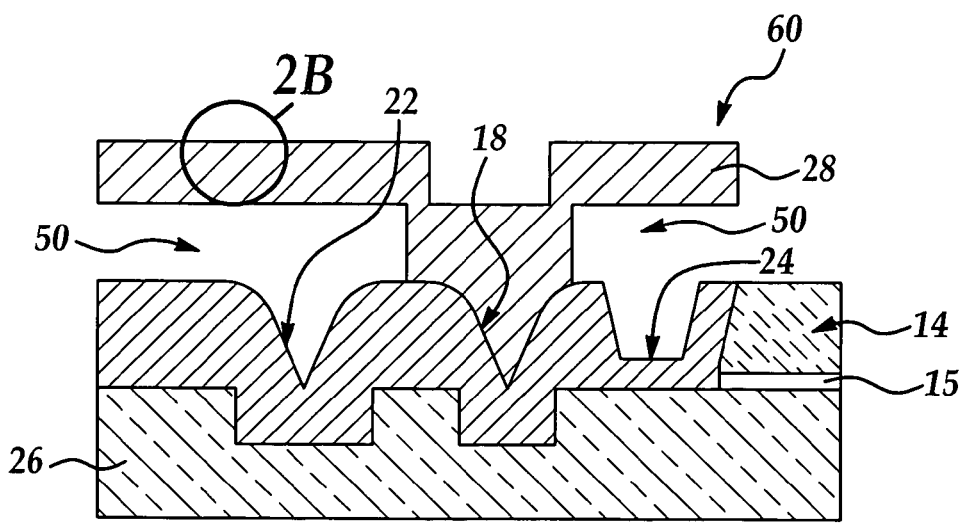
FIG. 5D is a cross-sectional view of an embodiment of FIG. 5C with the sacrificial layer removed.

The method includes removing the remaining portion of the sacrificial material 48, as depicted in FIG. 5D. Removal may be accomplished by any suitable method. Space(s) 50 are created between portions of the light-absorbing layer 28 and portions of the second region 16 after the remaining portion of the sacrificial material 48 is removed. As depicted, at least one portion of the light-absorbing layer 28 is directly in contact with a portion of the second region 16, such as at post 18 or other suitable support structure(s). The second portion of the light-absorbing layer 28 may be suspended relative to other elements of the second region 16, for example the flexure(s) 24 and the clearout region(s) 22, thereby defining space(s) 50 therebetween to yield a device which may be referred to as a single gap device 60.

During fabrication of the single gap device 60, the second region 16 has at least one supportive connector region (such as post 18) and at least one underlying region (such as flexure 24) covered by a sacrificial layer 48 that is interposed between the flexure 24 (or other element of the second region 16) and the light-absorbing layer 28. The sacrificial layer 48 is ultimately removed (e.g. etched away) such that the light-absorbing layer 28 is directly in contact with the post 18 and is suspended relative to the flexure 24.

Figure 6:
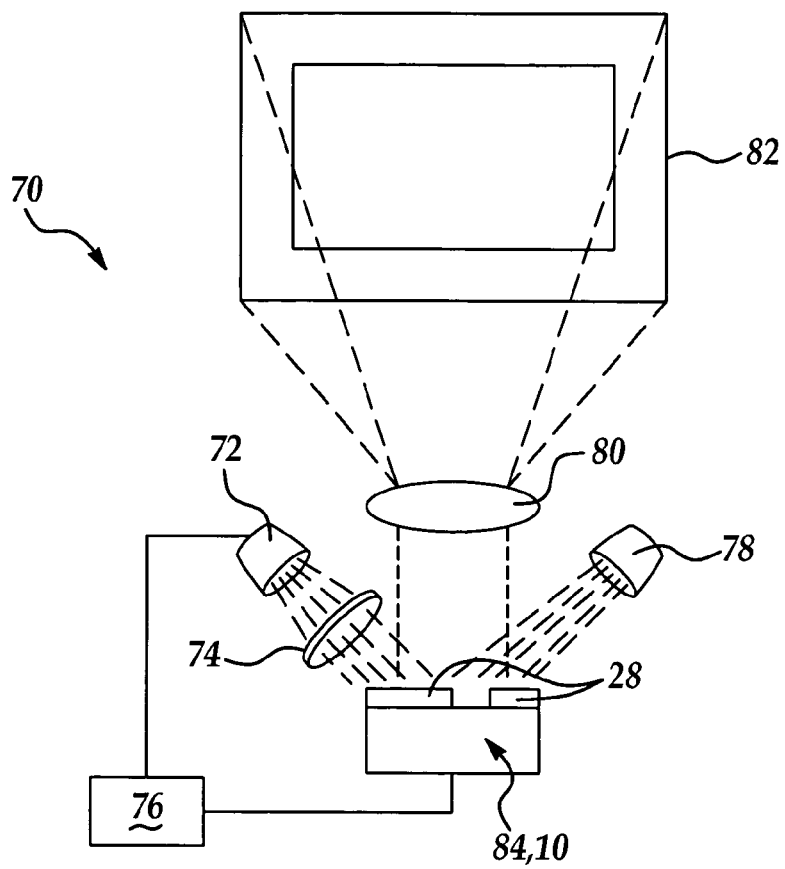
FIG. 6 is a schematic view of a display device utilizing the light-absorbing layer as depicted in FIG. 2B according to an example embodiment.

The light-absorbing layer 28 may be utilized in various systems including, but not limited to front and rear projectors, near eye devices, direct view displays, and integrated circuits. A non-limitative example of a display device is depicted in FIG. 6. It is contemplated that the display device 70 may include at least one pixel cell array configured with the light-absorbing layer 28 disclosed herein. As depicted in FIG. 6, light from light source 72 is focused on a light modulating device 84 (such as pixel cell 10) by lens 74. Although shown as a single lens, 74 is typically a group of lenses, integrators, and mirrors that together focus and direct light from light source 72 onto the surface of the pixel cell 10. Image data and control signals from controller 76 are written onto a suitable SRAM cell, DRAM cell, capacitor, or other memory element associated with each pixel cell 10, including the pixel itself or a pixel cell array in the light modulation device 84. The data in these associated cells may cause at least one pixel to actuate to the light modulating or "on" state. Pixel cells 10 that are in the unactivated or off state can reflect light away from projection lens 80 and optionally into a light trap 78. Alternatively, pixels in the on state can absorb light in a different portion of the visible spectrum than pixels in the off state, thus providing light modulation. In one embodiment, multiple pixel states with multiple absorbing characteristics may be employed. While multiple pixel cells 10 may be actuated to an "on" state to reflect light to projection lens 80, a single lens is shown for simplicity. Projection lens 80 focuses the light modulated by the light modulation device 84 onto a single image plane or screen 82.

At least a portion of light reflected off the regions 16 of the pixel cell 10 array of the spatial light modulating device 84 is absorbed by a light-absorbing layer 28 associated with the pixel cell 10 array and is prevented from reaching the projection lens 80 and/or single image plane 82.

Embodiments of the light-absorbing layer 28 may be used in a variety of applications. For example, the light-absorbing layer may be advantageously included in various projectors and integrated circuit architectures utilizing various light reflecting or light emitting devices.

In some embodiments, the integrated circuit will include a semiconductor substrate 26 as well as a first region 14 disposed on the semiconductor substrate 26. A second region 16 (typically composed of support structures not configured for light reflection and fabrication artifacts) is also disposed on the semiconductor substrate 26. A light-absorbing layer 28 may be in contact with at least a portion of the second region 16. It is contemplated that an integrated circuit such as one employing a pixel cell 10 having the light-absorbing layer 28 thereon may be used as a single wavelength tool if desired and/or required. For example, the integrated circuit having the light-absorbing layer 28 disposed thereon may be tunable to a wavelength (a non-limiting example of which includes 190 nm) to obtain low light reflectance at a specific range from the incidental light reflective region 16.

To further illustrate the light-absorbing layer 28 and light modulating device 84 disclosed herein, reference is made to the following examples. The following examples are for illustrative purposes and are not intended to limit the scope of the present disclosure or embodiments as claimed.

EXAMPLE 1

In order to evaluate the effectiveness of light-absorbing layers 28 in light modulation devices, a test device having pixel cells with first regions and second regions was fabricated having the general configuration as shown in FIG. 1.

A sacrificial layer was deposited over the first region and second region. A light-absorbing layer was formed over the second region (and on the sacrificial layer) by first depositing a first layer including 800 angstroms of aluminum. Then, a standoff (third) layer including 500 angstroms of silicon dioxide was deposited on the aluminum. The light-absorbing layer was completed by depositing a second layer including 75 angstroms of tantalum aluminum on the silicon dioxide.

Figure 7:
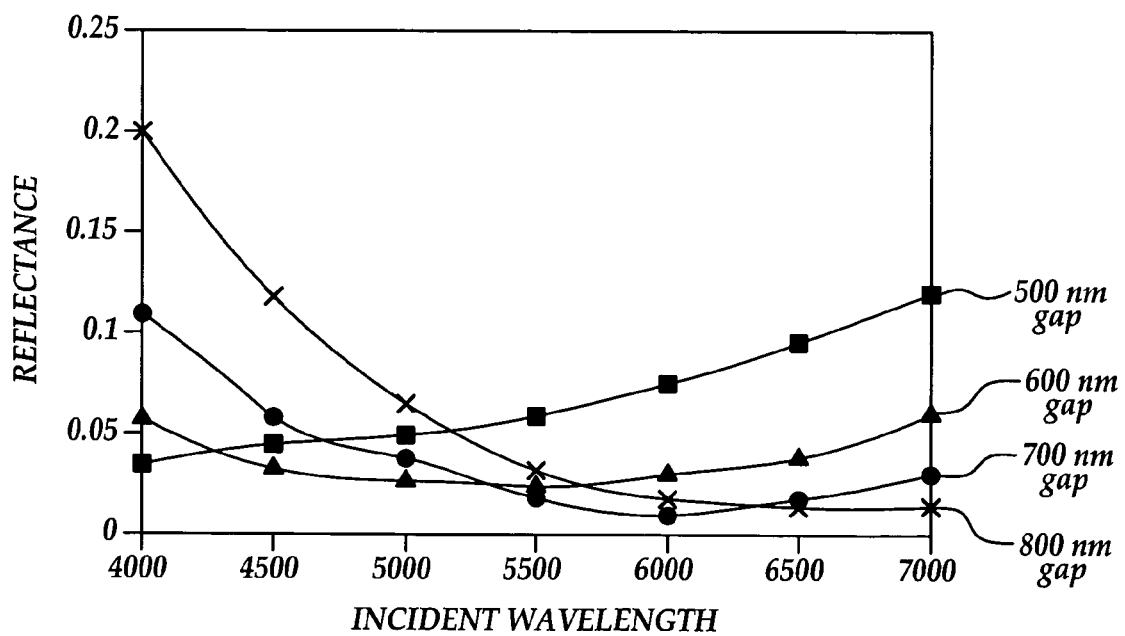
FIG. 7 is a graph depicting the optical reflectance of various embodiments of the light-absorbing layer.

The resulting device was evaluated according to various parameters and found to be functional with reduced reflections from the incidental light reflective regions.

tance of the light-absorbing layer averages about 4% across the visible spectrum with a standoff layer thickness of 600 angstroms of silicon dioxide (described in Example 2). The aluminum layers in examples 1–4 were found to have a reflectivity of about 92%, while the tantalum aluminum layers have a reflectivity of about 18%. As shown in FIG. 7, the reflectance of light from the second region was reduced when the light-absorbing layers were present.

EXAMPLE 5

A calculation of the reflectance of the pixel cell in its dark state, both with and without the light-absorbing layer, was performed. The reflectance of one pixel cell having a light-absorbing layer including a first layer of 800 angstroms of aluminum, a standoff (third) layer of 600 angstroms of silicon dioxide, and a second layer of 75 angstroms of tantalum aluminum was compared to the reflectance of a similar pixel cell in which the light-absorbing layer was omitted.

Total reflectance of the first region and the second region for the pixel prepared without the light-absorbing layer was calculated. The results are shown in Table 1.

The results indicate that without the light-absorbing layer, the total reflectance of the entire pixel cell is about 15% due in part to the reflection from the second region. The light from this region dominates the percentage of the total reflected light, thus generally degrading the color gamut and contrast of the total system.

TABLE 1

% Area of Pixel Cell Regions & Contribution to Reflected Light Without Light-absorbing Layer (HID Layer)

| Region | Squares | % Area | % Reflectance | % Total Input Light Reflected | % Total Reflected Light |
| --- | --- | --- | --- | --- | --- |
| Bottom Capacitor Plate Area | 824 | 8.16% | 92.0% | 7.51% | 48.0% |
| Flexure & Post Area | 973 | 9.64% | 46.0% | 4.43% | 28.3% |
| Clearout | 49 | 0.49% | 92.0% | 0.45% | 2.9% |
| Pixel Area | 8250 | 81.72% | 4.0% | 3.27% | 20.9% |
| Total | 10096 | 100.00% | | 15.66% | 23.7% |

EXAMPLES 2–4

Optical simulation results of the reflectance of various light-absorbing layers in which the thickness of the silicon dioxide layer (standoff (third) layer) of the light-absorbing layer was altered to 600, 700, and 800 angstroms, respectively, (as described in Examples 1 through 4) are depicted in FIG. 7.

The graph of FIG. 7 shows the percent reflectivity versus the incidental wavelength. As shown in FIG. 7, the reflec- The total reflectance of the second region of the pixel cell with the light-absorbing layer thereon and the total reflectance of the corresponding first region was calculated and is collected in Table 2. While the total reflectance of the pixel remains at about 4%, the amount of reflected light is now dominated by the first region (the pixel) rather than by the second region (the bottom capacitor plate area, flexures, posts, and clearout regions). A slight reduction in the percent of active area (first region) from 81.7% to 76.7% was noted.

TABLE 2

% Area of Pixel Cell Regions & Contribution to Reflected Light With Light-absorbing Layer (HID Layer)

| Region | Squares | % Area | % Reflectance (With HID) | % Total Input Light Reflected | % Total Reflected Light |
|---|---|---|---|---|---|
| HID Area | 2566 | 23.31% | 4.0% | 0.93% | 23.3% |
| Pixel Area | 8444 | 76.69% | 4.0% | 3.07% | 76.7% |
| Total | 11010 | 100.00% |  | 4.00% | 100.00% |

Hence, in some embodiments, the dark state reflection of the first region and second region may be reduced with the utilization of the light-absorbing layer over the second region. The light-absorbing layer of aluminum, silicon dioxide, and tantalum aluminum has about 4% reflectivity as opposed to the about 9% reflectivity of a light-absorbing layer including aluminum, silicon dioxide, and titanium nitride. The lower reflectivity may result in higher contrast for some embodiments.

While several embodiments have been described in detail, it will be apparent to those skilled in the art that the disclosed embodiments may be modified. Therefore, the foregoing description is to be considered exemplary rather than limiting.

What is claimed is:

1. A spatial light modulator, comprising:
   a primary light reflective region;
   an incidental light reflective region; and
   a light-absorbing layer contacting at least a portion of the incidental light reflective region, the light-absorbing layer including:
      a reflective first layer having a reflectivity greater than about 75%; and
      a second layer connected to the reflective first layer, the second layer having a reflectivity less than about 75%.

2. The spatial light modulator as defined in claim 1 wherein the second layer comprises at least one of tantalum aluminum alloys, tungsten silicon nitride alloys, tantalum nitride alloys, nickel, nickel alloys, titanium nitride alloys, and mixtures thereof.

3. The spatial light modulator as defined in claim 1 wherein the second layer comprises tantalum aluminum.

4. The spatial light modulator as defined in claim 1 wherein the second layer is capable of absorbing at least a portion of directed light having a wavelength between 400 and 700 nanometers.

5. The spatial light modulator as defined in claim 1 wherein the light-absorbing layer further comprises a third layer interposed between the first layer and the second layer.

6. The spatial light modulator as defined in claim 5 wherein the third layer is a standoff layer that has an optical transparency and a thickness so as to absorb at least a portion of the light.

7. The spatial light modulator as defined in claim 5 wherein the third layer comprises at least one of silicon dioxide, silicon nitride, silicon carbide, and air.

8. The spatial light modulator as defined in claim 5 wherein the third layer has a thickness between about 300 angstroms and about 8000 angstroms.

9. The spatial light modulator as defined in claim 1 wherein the light-absorbing layer further comprises a fourth layer disposed on the second layer.

10. The spatial light modulator as defined in claim 9 wherein the fourth layer comprises a transparent dielectric.

11. The spatial light modulator as defined in claim 10 wherein the transparent dielectric has a graded refractive index adapted to reduce surface reflections from the transparent dielectric.

12. The spatial light modulator as defined in claim 9, wherein the fourth layer comprises a series of layers.

13. The spatial light modulator as defined in claim 12 wherein the series of layers comprises at least one of magnesium difluoride, titanium dioxide, silicon dioxide, magnesium oxide, alumina, zirconium dioxide, yttrium oxide, barium difluoride, calcium difluoride, lead fluoride, thorium dioxide, chromium oxide, hafnium dioxide, tin dioxide, zinc oxide, tantalum pentoxide, cadmium sulfide, zinc sulfide, and mixtures thereof.

14. The spatial light modulator as defined in claim 1 wherein the first layer comprises at least one of aluminum, aluminum alloys, silver, silver alloys, gold, gold alloys, copper, end mixtures thereof.

15. The spatial light modulator as defined in claim 1 wherein the first layer has a thickness between about 300 angstroms and about 5000 angstroms.

16. The spatial light modulator as defined in claim 1 wherein the second layer has a thickness between about 50 angstroms and about 300 angstroms.

17. The spatial light modulator as defined in claim 1 wherein the light-absorbing layer absorbs at least a portion of light in a wavelength between about 400nm and about 700 nm.

18. The spatial light modulator as defined in claim 1 wherein the incidental light reflective region comprises a support post.

19. The spatial light modulator as defined in claim 1 wherein a passivation layer is disposed between the incidental light reflective region and the light-absorbing layer.

20. A method of making a spatial light modulator, comprising:
   providing a primary light reflective region capable of color generation by modulation and an incidental light reflective region coupled to the primary light reflective region; and
   establishing a light-absorbing layer in contact with the incidental light reflective region, the light-absorbing layer including:
      a reflective first layer having a reflectivity greater than about 75%; and
      a second layer connected to the first layer, the second layer having a reflectivity less than about 75%.

21. The method as defined in claim 20 wherein the second layer comprises at least one of tantalum aluminum alloys, tungsten silicon alloys, tantalum nitride alloys, nickel, nickel alloys, titanium nitride alloys, and mixtures thereof.

22. The method as defined in claim 20, further comprising depositing a passivation layer in contact with the primary and secondary light reflective regions prior to establishing the light-absorbing layer.

23. The method as defined in claim 20 wherein the light-absorbing layer further comprises a third layer established between the first and second layers.

24. A device, comprising:
means for modulating light;
means for supporting the means for light modulating; and
means for absorbing light, contacting at least a portion of the supporting means, the absorbing means including:
a reflective first layer having a reflectivity greater than about 75%; and
a second layer connected to the first layer, the second layer having a reflectivity less than about 75%.

25. The device as defined in claim 24 wherein the second layer comprises at least one of tantalum aluminum alloys, tungsten silicon nitride alloys, tantalum nitride alloys, nickel, nickel alloys, titanium nitride alloys, and mixtures thereof.

26. The device as defined in claim 24 wherein at least a portion of the light absorbed has a wavelength between about 400 nm and about 700 nm.

27. A display device, comprising:
a light source for providing a beam of light along a first light path;
a light modulation device on the first light path for selectively reflecting a portion of the beam of light along a second light path in response to image data signals;
a controller for providing image data signals to the light modulation device; and
at least one element on the second light path for resolving the selectively reflected light into an image;
wherein the light modulation device includes:
a primary light reflective region;
an incidental light reflective region; and
a light-absorbing layer contacting at least a portion of the incidental light reflective region, the light-absorbing layer including:
a first layer having a reflectivity greater than about 75%; and
a second layer connected to the first layer, the second layer having a reflectivity less than about 75%.

28. The display device as defined in claim 27 wherein the display device is a dual gap device and wherein the light modulation device has a passivation layer disposed on the primary light reflective region and interposed between the incidental light reflective region and the light-absorbing layer.

29. The display device as defined in claim 27 wherein the display device is a single gap device and wherein the incidental light reflective region comprises at least one past and at least one flexure.

30. The display device as defined in claim 29 wherein light modulation device further comprises a removable sacrificial layer interposed between the at least one flexure end the light-absorbing layer.

31. The display device as defined in claim 27 wherein the light-absorbing layer is configured to substantially prevent light from being reflected off of the incidental light reflective region and wherein the second layer comprises at least one of tantalum aluminum, alloys thereof, and mixtures thereof.

32. A projector, comprising:
a light source for providing a beam of light along a first light path;
a light modulation device on the first light path for selectively reflecting a portion of the beam of light along a second light path in response to image data signals;
a controller for providing image data signals to the light modulation device; and
at least one element on the second light path for resolving the selectively reflected light into an image;
wherein the light modulation device includes:
a primary light reflective region;
an incidental light reflective region; and
a light-absorbing layer contacting at least a portion of the incidental light reflective region, the light-absorbing layer including:
a first layer having a reflectivity greater than about 75%; and
a second layer connected to the first layer, the second layer having a reflectivity less than about 75%.

33. A spatial light modulator, comprising:
a first region;
a second region; and
a light-absorbing layer contacting at least a portion of the second region, the light-absorbing layer including:
a first layer having a reflectivity less than about 75%; and
a tantalum aluminum layer connected to the first layer.

34. The spatial light modulator as defined in claim 33 wherein the light-absorbing layer further comprises a third layer interposed between the first layer and the tantalum aluminum layer.

35. The spatial light modulator as defined in claim 33 wherein the third layer is a standoff layer that has an optical transparency and a thickness so as to absorb at least a portion of the light.

36. The spatial light modulator as defined in claim 35 wherein the standoff layer comprises at least one of silicon dioxide, silicon nitride, silicon carbide, and air.

37. The spatial light modulator as defined in claim 35 wherein the standoff layer has a thickness between about 250 angstroms and about 1000 angstroms.

38. The spatial light modulator as defined in claim 33 wherein the light-absorbing layer further comprises a transparent dielectric layer disposed on the second layer.

39. The spatial light modulator as defined in claim 33 wherein the first layer comprises at least one of aluminum, aluminum alloys, silver, silver alloys, gold, gold alloys, tantalum aluminum, titanium nitride, tungsten silicon nitride, tungsten, silicon, chromium, copper, and mixtures thereof.

40. The spatial light modulator as defined in claim 33 wherein the first layer comprises tantalum aluminum having a reflectivity of about 46%, and wherein the tantalum aluminum layer has a reflectivity of about 18%.

* * * * *

UNITED STATES PATENT AND TRADEMARK OFFICE
CERTIFICATE OF CORRECTION

PATENT NO. : 7,187,487 B2 Page 1 of 1
APPLICATION NO. : 10/903032
DATED : March 6, 2007
INVENTOR(S) : Przybyla et al.

It is certified that error appears in the above-identified patent and that said Letters Patent is hereby corrected as shown below:

In the Claims

Col. 15 (line 54), delete "past" and insert therefor --post--.

Col. 15 (line 59), delete "end" and insert therefor --and--.

Signed and Sealed this

Thirteenth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,187,487 B2  Page 1 of 1
APPLICATION NO. : 10/903032
DATED : March 6, 2007
INVENTOR(S) : Przybyla et al.

It is certified that error appears in the above-identified patent and that said Letters Patent is hereby corrected as shown below:

In the Claims

Col. 15 (line 54), delete "past" and insert therefor --post--.

Col. 15 (line 59), delete "end" and insert therefor --and--.

Signed and Sealed this

Twenty-seventh Day of November, 2007

JON W. DUDAS
*Director of the United States Patent and Trademark Office*